(12) United States Patent
Kumar et al.

(10) Patent No.: US 12,521,456 B2
(45) Date of Patent: Jan. 13, 2026

(54) DISINFECTION DEVICE FOR FEMALE CONNECTORS

(71) Applicant: Becton, Dickinson and Company, Franklin Lakes, NJ (US)

(72) Inventors: Manish Kumar, Arrah (IN); Hemant Vilas Belsare, Karnataka (IN); Praveen Nalawade, Karnataka (IN)

(73) Assignee: Becton, Dickinson and Company, Franklin Lakes, NJ (US)

( * ) Notice: Subject to any disclaimer, the term of this patent is extended or adjusted under 35 U.S.C. 154(b) by 670 days.

(21) Appl. No.: 17/708,343

(22) Filed: Mar. 30, 2022

(65) Prior Publication Data

US 2023/0310679 A1    Oct. 5, 2023

(51) Int. Cl.
| | |
|---|---|
| *A61L 2/18* | (2006.01) |
| *A61L 2/26* | (2006.01) |
| *A61M 39/16* | (2006.01) |
| *A61M 39/20* | (2006.01) |
| *A61L 101/02* | (2006.01) |
| *A61L 101/32* | (2006.01) |

(52) U.S. Cl.
CPC ................. *A61L 2/18* (2013.01); *A61L 2/186* (2013.01); *A61L 2/26* (2013.01); *A61M 39/162* (2013.01); *A61M 39/20* (2013.01); *A61L 2101/02* (2020.08); *A61L 2101/32* (2020.08); *A61L 2202/121* (2013.01); *A61L 2202/122* (2013.01); *A61L 2202/123* (2013.01); *A61L 2202/24* (2013.01); *A61M 2205/0216* (2013.01)

(58) Field of Classification Search
CPC ........ A61M 39/20; A61L 2/18; A61L 2202/24
See application file for complete search history.

(56) References Cited

U.S. PATENT DOCUMENTS

| | | | |
|---|---|---|---|
| 2006/0030827 A1 | 2/2006 | Raulerson | |
| 2009/0205151 A1* | 8/2009 | Fisher | B08B 9/021 15/104.04 |
| 2010/0050351 A1 | 3/2010 | Colantonio et al. | |
| 2014/0366914 A1* | 12/2014 | Kerr | A61B 1/122 15/104.93 |
| 2017/0203087 A1 | 7/2017 | Ryan et al. | |
| 2018/0361003 A1* | 12/2018 | Dombrowski | A61M 39/162 |
| 2020/0197686 A1* | 6/2020 | Anderson | A61M 39/18 |

OTHER PUBLICATIONS

PCT International Search Report and Written Opinion in PCT/US2023/016680 dated Jun. 21, 2023, 13 pages.

* cited by examiner

*Primary Examiner* — Donald R Spamer
*Assistant Examiner* — Kayla Rose Sarantakos
(74) *Attorney, Agent, or Firm* — Servilla Whitney LLC

(57) ABSTRACT

A device for connection to a female medical connector is disclosed, the device includes a cap, a scrubbing foam, an elastic sealing lip, and an absorbent material. The cap is configured to define a chamber to contain an absorbent material and disinfectant or antimicrobial agent. The cap may include one or more threads adapted to engage with a female luer connector. The device may also include a peelable seal to maintain sterility prior to use and to prevent the disinfectant or the antimicrobial agent from exiting the chamber prior to use. Also described are methods of disinfecting a medical connector.

23 Claims, 5 Drawing Sheets

DISINFECTION DEVICE FOR FEMALE CONNECTORS

TECHNICAL FIELD

The present disclosure generally relates to a device for disinfecting and sterilizing access ports with female luer fittings.

BACKGROUND

Vascular access devices (VAD's) are commonly used therapeutic devices and include intravenous (IV) catheters. There are two general classifications of VAD's, peripheral catheters and central venous catheters. Bacteria and other microorganisms may gain entry into a patient's vascular system from access hubs, ports or valves upon connection to the VAD when delivering a fluid or pharmaceutical. Each access hub, port, valve or connection is associated with some risk of transmitting a catheter related bloodstream infection (CRBSI), which can be costly and potentially lethal.

In order to decrease CRBSI cases and to ensure VAD's are used and maintained correctly, standards of practice have been developed, which include disinfecting and cleaning procedures.

Disinfection caps have been added to the Society for Healthcare Epidemiology of America (SHEA) guidelines and caps are also incorporated into the Infusion Nurses Standards (INS) guidelines.

In developed markets, when utilizing an IV catheter, a needleless connector will typically be used to close off the system and then subsequently accessed to administer medication or other necessary fluids via the catheter to the patient. INS Standards of Practice recommend the use of a needleless connector and state that it should be "consistently and thoroughly disinfected using alcohol, tincture of iodine or chlorhexidine gluconate/alcohol combination prior to each access." The disinfection of the needleless connector is ultimately intended to aid in the reduction of bacteria that could be living on the surface and possibly lead to a variety of catheter related complications including CRBSI. Nurses will typically utilize a 70% isopropyl alcohol (IPA) pad to complete this disinfection task by doing what is known as "scrubbing the hub." However, compliance to this practice is typically very low. In addition to a lack of compliance to "scrubbing the hub", it has also been noted through clinician interviews that there is often a variation in scrub time, dry time and the number of times the needleless connector is scrubbed.

Throughout the sequence of procedures associated with the transmission of a microorganism that can cause a CRBSI, there are many risks of contact or contamination. Contamination can occur during drug mixing, attachment of a cannula, and insertion into the access hub. Because the procedure to connect to a VAD is so common and simple, the risk associated with entry into a patient's vascular system has often been overlooked. Presently, the risk to hospitals and patients is a substantial function of the diligence of the clinician performing the connection, and this diligence is largely uncontrollable.

Currently available disinfection caps do not provide active disinfection or scrubbing of the outer threaded portion of female luer wherein most of the contaminants e.g., blood stains/debris/microbial colonies, etc. are present.

Currently available disinfection caps also do not mechanically seal the internal components of the disinfection device that can act as a physical barrier to contaminants between environment and cap internal while allowing an exchange of air across its boundary.

Currently many nursing units mandate the practice of scrubbing the IV connector hub, even if the connector has a disinfection cap. However, in some instances, a nursing unit may stop using disinfecting caps to avoid inducing the nursing staff to "take shortcuts" to not scrub the hub.

Thus, there is a need for a disinfection cap that has both the ability to attach to the hub in order to protect and disinfect the needle-free connector while also allowing compliance to the clinical practice of "scrub-the-hub" before accessing the line.

SUMMARY

One aspect of the present disclosure pertains to a disinfection device for connection to a medical connector. According to an exemplary embodiment of the present disclosure, a device generally comprises a cap, a scrubbing foam, an elastic sealing lip, an absorbent material, a disinfectant or an antimicrobial agent, a peripheral ledge disposed at the open proximal end, and a groove disposed in the interior wall surface of the annular wall configured to secure the elastic sealing lip and scrubbing foam to the open proximal end. The cap comprises an integral body, a closed end, an annular wall having a length extending from the closed end to an open end that defines a chamber containing an absorbent material and disinfectant or antimicrobial agent. The open end defines an end face and includes a peripheral ledge extending radially inward from the annular wall. The open end defines an engagement surface.

The scrubbing foam comprises a plurality of bristle-type precut projections.

The annular wall of the cap comprises an exterior wall surface and an interior wall surface. The interior wall surface defines an opening adjacent the open end.

The elastic sealing lip comprises a dilatable opening therethrough sized and adapted to receive a female luer connector. The dilatable opening can be sized to frictionally engage a female luer connector. In one or more embodiments, the dilatable opening has a diameter that is dilatable from an initial diameter of from about 6-7 mm to a dilated diameter of about 7-8 mm. In one or more embodiments, the peripheral ledge is sized and adapted to receive an elastic sealing lip and scrubbing foam. In one or more embodiments, the elastic sealing lip is in contact with the peripheral ledge. In one or more embodiments, the female luer connector engages the dilatable opening upon insertion into the chamber through the dilatable opening of the elastic sealing lip.

In one or more embodiments, the peripheral ledge is sized and adapted to receive the elastic sealing lip.

In one or more embodiments, the interior wall surface comprises internal threads adjacent to the closed end. The internal threads are adapted and sized to engage a female luer connector.

In one or more embodiments, the internal threads partially extend along a length of the interior wall surface of the cap adjacent the closed end of the cap.

The absorbent material and the disinfectant or the antimicrobial agent contacts the female luer connector after insertion of the connector through the dilatable opening of the elastic sealing lip.

In one or more embodiments, a peelable seal engages with the engagement surface of end face of the cap and secures the elastic sealing lip to the open end. The peelable seal can be disposed on the end face of the cap to prevent the disinfectant or the antimicrobial agent from exiting the chamber.

In one or more embodiments, the female luer connector is selected from the group consisting essentially of needle-free connectors, catheters, luer connectors, stopcocks, and hemodialysis connectors.

The elastic sealing lip comprises an elastomeric material. In one or more embodiments, the elastomeric material of the elastic sealing lip comprises a thermoplastic elastomer.

The cap can be made from any of a number of types of plastic materials such as polycarbonate, polypropylene, polyethylene, glycol-modified polyethylene terephthalate, acrylonitrile butadiene styrene or any other moldable plastic material used in medical devices. In one or more embodiments, the cap and the comprises a polypropylene or polyethylene material. In one or more embodiments, the exterior cap surface includes a plurality of grip members.

In one or more embodiments, the absorbent material is under radial compression by the internal threads to retain the absorbent material in the chamber. In one or more embodiments, the absorbent material is retained in the chamber without radial compression by the internal threads. In one or more embodiments, the absorbent material is a nonwoven material, foam or a sponge. In a specific embodiment, the foam is a polyurethane foam.

In one or more embodiments, the disinfectant or antimicrobial agent is selected from the group consisting essentially of isopropyl alcohol, ethanol, 2-propanol, butanol, methylparaben, ethylparaben, propylparaben, propyl gallate, butylated hydroxyanisole (BHA), butylated hydroxytoluene, t-butyl-hydroquinone, chloroxylenol, chlorhexidine, chlorhexidine diacetate, chlorhexidine gluconate, povidone iodine, alcohol, dichlorobenzyl alcohol, dehydroacetic acid, hexetidine, triclosan, hydrogen peroxide, colloidal silver, benzethonium chloride, benzalkonium chloride, octenidine, antibiotic, and mixtures thereof. In a specific embodiment, the disinfectant or antimicrobial agent comprises at least one of chlorhexidine gluconate and chlorhexidine diacetate. In one or more embodiments, the disinfectant or antimicrobial agent is a fluid or a gel.

Compression of the absorbent material toward the closed end of the chamber upon connection to the female luer connector allows the connector to contact the disinfectant or antimicrobial agent to disinfect the female luer connector.

In one or more embodiments, the peelable seal comprises an aluminum or multi-layer polymer film peel back top. In a specific embodiment, the peelable seal is heat-sealed or induction sealed to an engagement surface on the end face of the peripheral ledge.

A second aspect of the present disclosure pertains to a method of disinfecting a medical connector. The method comprises connecting the disinfection device of one or more embodiments to a medical connector, wherein connecting includes engaging the interior wall surface upon insertion into the chamber such that the medical connector contacts the scrubbing foam, the plurality of bristle-type precut projections on the scrubbing foam, the absorbent material and the disinfectant or antimicrobial agent.

A third aspect of the present disclosure pertains to an assembly. The assembly comprises the device of one or more embodiments connected to a medical connector. In one or more embodiments, the medical connector is a female luer connector.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

Embodiments of the disclosure pertain to a sterile, single-use female luer scrubbing disinfecting device for connection to and disinfection of a female medical connector, specifically injection ports and female luer hubs, in which the device comprises a disinfecting cap, a scrubber foam, an elastic sealing lip, absorbent material, and a disinfectant or the antimicrobial agent. A peelable seal may be attached to an open proximal end to preserve sterility of the disinfecting cap prior to use. The disinfecting device of the present disclosure provides a mechanical barrier for female connectors and contains a disinfectant or an antimicrobial agent for disinfection. The device of the present disclosure allows the practitioner to streamline the disinfecting process.

With respect to terms used in this disclosure, the following definitions are provided.

As used herein, the use of "a," "an," and "the" includes the singular and plural.

As used herein, the term "catheter related bloodstream infection" or "CRBSI" refers to any infection resulting from the presence of a catheter or IV line.

As used herein, the term "Luer connector" refers to a connection collar that is the standard way of attaching syringes, catheters, hubbed needles, IV tubes, etc. to each other. The Luer connector consists of male and female interlocking tubes, slightly tapered to hold together better with even just a simple pressure/twist fit. Luer connectors can optionally include an additional outer rim of threading, allowing them to be more secure. A Luer connector comprises a distal end, a proximal end, an irregularly shaped outer wall, a profiled center passageway for fluid communication from the chamber of the barrel of a syringe to the hub of a vascular access device (VAD). A Luer connector also has a distal end channel that releasably attaches the Luer connector to the hub of a VAD, and a proximal end channel that releasably attaches the Luer connector to the barrel of a syringe.

Figure 1:
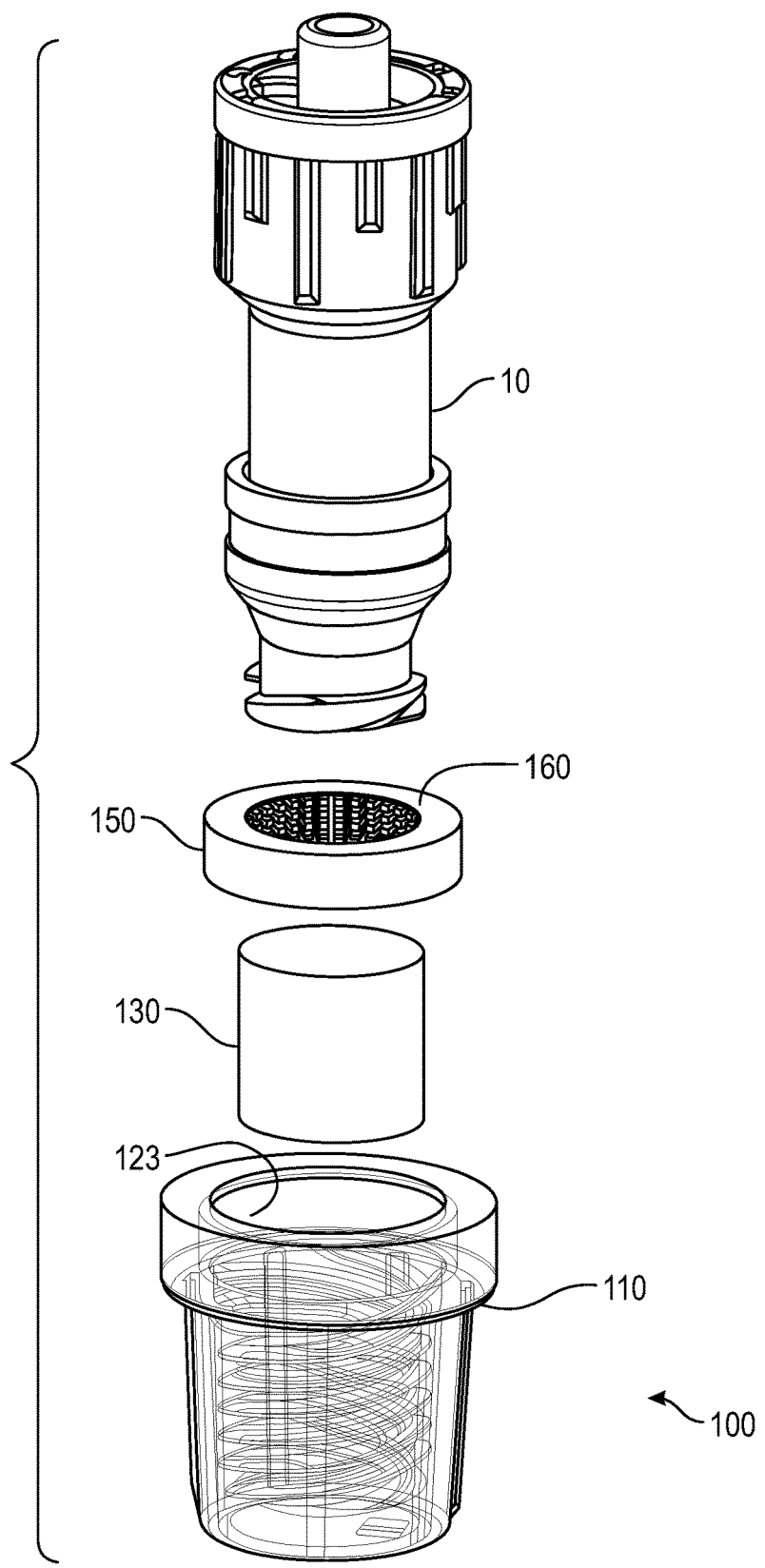
FIG. 1 illustrates an exploded perspective top view of an exemplary disinfection device according to an embodiment of the present disclosure along with a female medical connector of the prior art.

An exploded view of the disinfection device of the present disclosure, along with a female connector 10 according to the prior art is shown in FIG. 1. In one or more embodiments, the female connector 10 may be a needle-free connectors, catheter luer connectors, stopcocks, or hemodialysis connectors.

Figure 2:
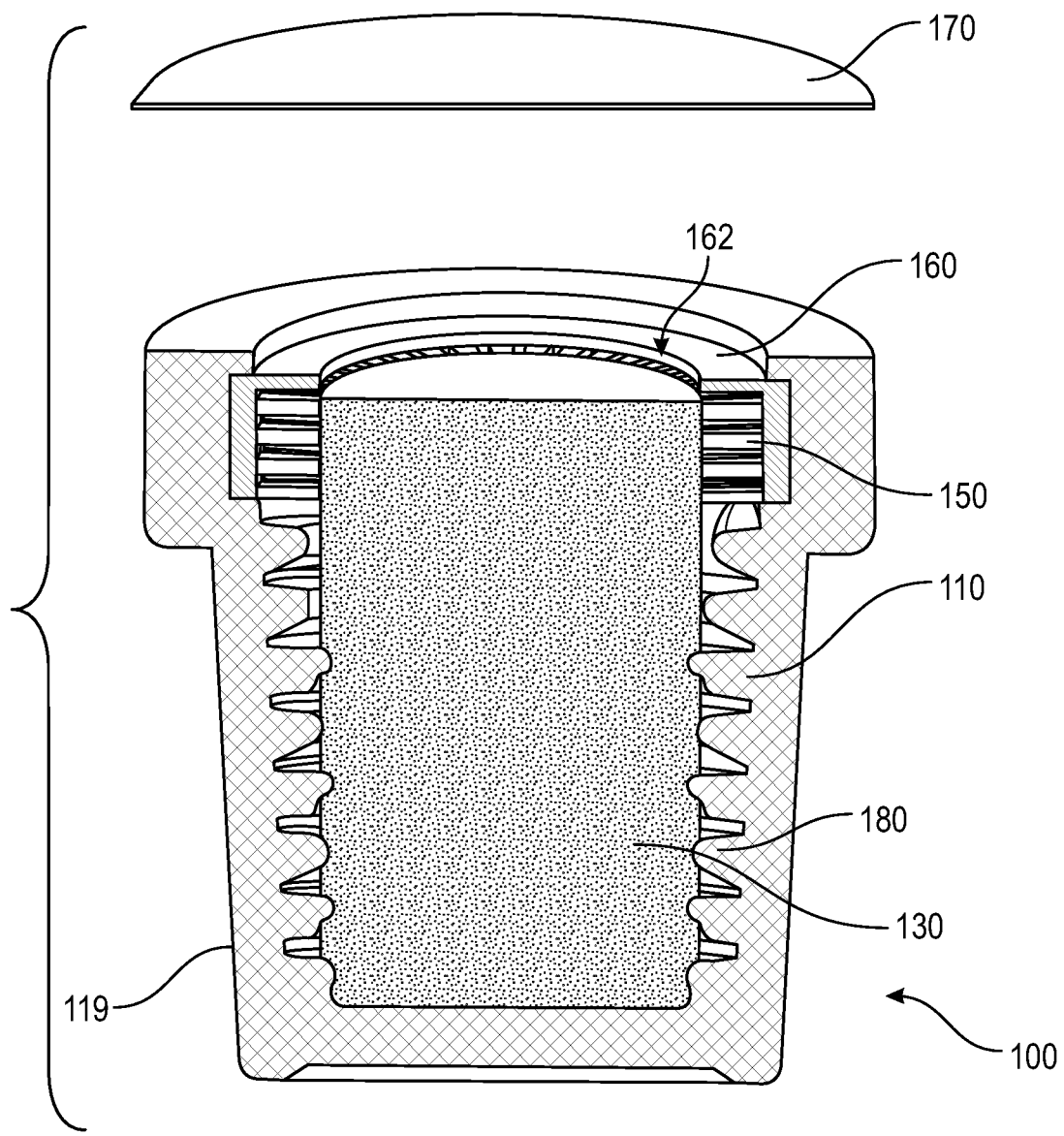
FIG. 2 shows a cross-sectional view of an assembled disinfection device according to an embodiment shown in FIG. 1.
Figure 3:
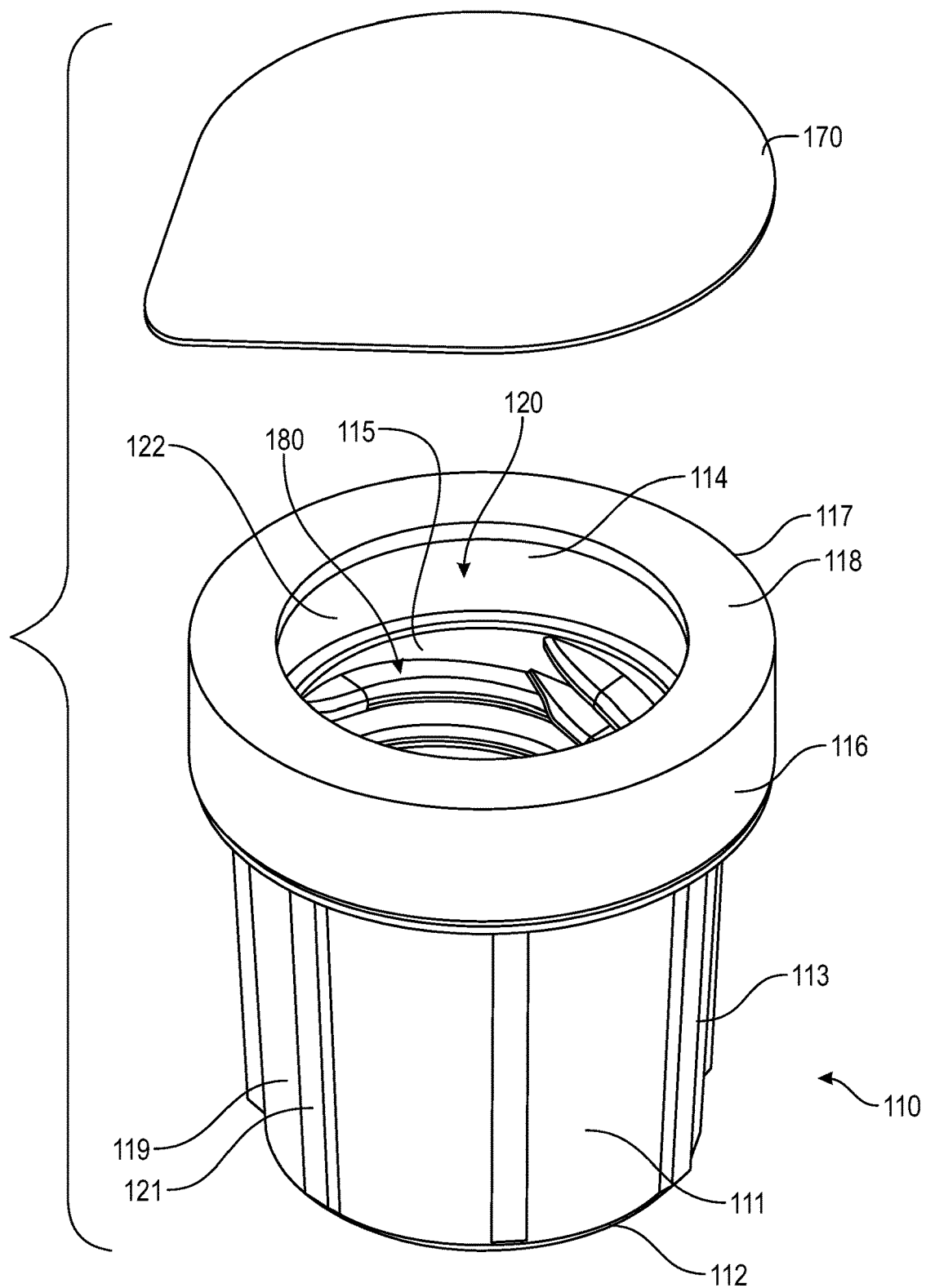
FIG. 3 shows a top perspective view of a cap of the device of FIG. 1.
Figure 4:
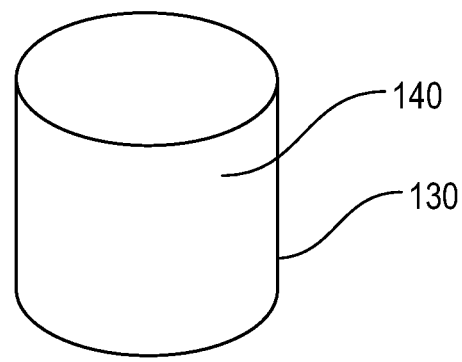
FIG. 4 shows a top perspective view of an absorbent material of the device of FIG. 1.
Figure 5:
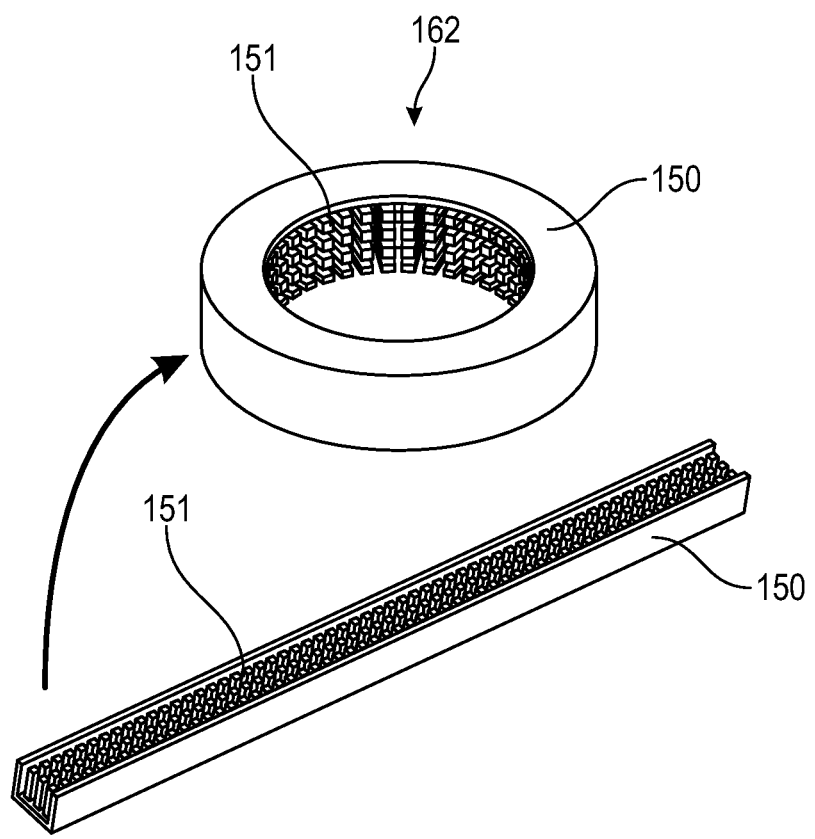
FIG. 5 shows a top perspective view of a scrubbing foam of the device of FIG. 1.

FIG. 2 shows a cross-sectional view of the assembled disinfection device of the present disclosure, with the individual components shown separately in FIGS. 3-5. Referring to FIGS. 1-3, a disinfection device 100 for connection to a female medical connector according to an exemplary embodiment of the present disclosure generally comprises a cap 110, absorbent material 130, a disinfectant or an antimicrobial agent 140, a scrubbing foam 150, an elastic sealing lip 160. A peelable seal 170 may be used to seal the cap 110 prior to use to prevent ingress of contaminants and to prevent loss of the disinfectant or an antimicrobial agent 140 prior to use.

Referring to FIGS. 2 and 3, the cap 110 comprises an integral body 111, a closed end 112, an annular wall 113 extending from the closed end 112 to an open end 114 that defines a chamber 115 containing an absorbent material 130 and disinfectant or antimicrobial agent 140. The open end 114 defines an end face 117 and comprises a peripheral ledge 116 extending radially outward from the annular wall 113. The open end 114 also defines an engagement surface 118. Referring to FIG. 3, the cap 110 comprises an annular wall 113 extending from a closed end 112 to a open end 114. Referring to FIG. 3, the annular wall 113 of the cap 110 comprises an exterior wall surface 119 and an interior wall surface 123. The interior wall surface 123 defines an opening 120 adjacent the open end 114 and has a recessed radial cavity 122 disposed within the interior wall surface 123 near the open end 114. Referring to FIG. 3, in one or more embodiments, the exterior wall surface 119 of the cap 110 comprises a plurality of grip members 121.

Cap 110 houses the absorbent material 130, a disinfectant or an antimicrobial agent 140, a scrubbing foam 150, and elastic sealing lip 160 within it. The cap 110 connects to an incoming female connector. In one or more embodiments, the cap is composed of a plastic material. Scrubbing foam 150 is retained within the recessed cavity 122 interior wall surface 123 near the open end 114 of cap 110.

Figure 6:
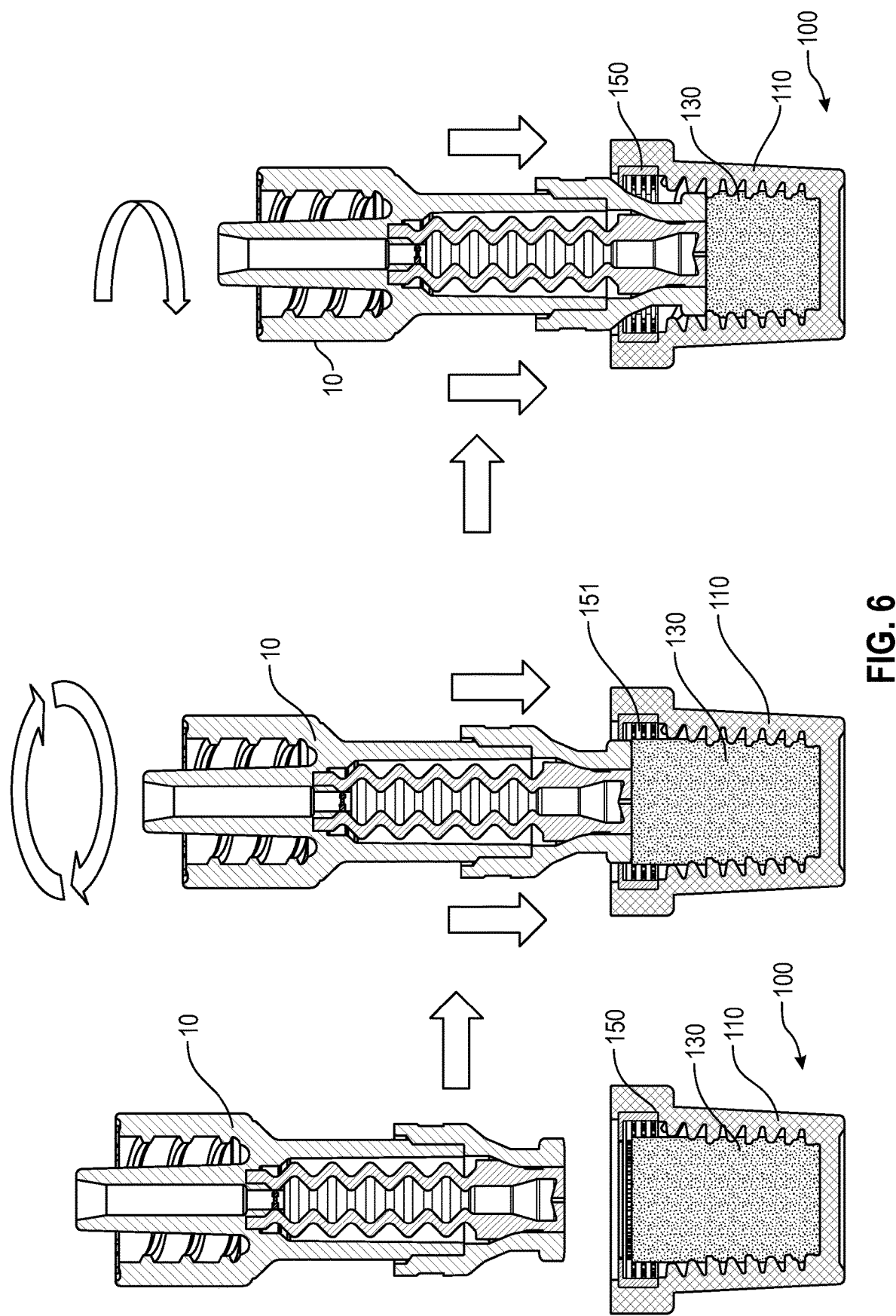
FIG. 6 illustrates a cross-section view of a female medical connector of the prior art in combination with a disinfection device of FIG. 1.

Referring to FIG. 3 and FIG. 6, device 100 with cap 110 engages with female luer connectors thereby allowing the user to clean the female connector using both active disinfection and passive disinfection with a single device. In one or more embodiments, the cap of the device of the present disclosure has threads 180 that have a size and pitch to engage a threadable segment of a female connector, such as for example, a female luer connector. Such connectors are generally and commonly used as catheter and other fluid-tight protective connectors in medical applications. In one or more embodiments, the interior wall surface 123 of the annular wall 113 comprises internal threads 180. The internal threads 180 are adapted and sized to engage a female luer connector. In one or more embodiments, the internal threads 180 are disposed adjacent the closed end 112 of the cap 110 and partially extend along a length of the interior wall surface 123 of the cap 110. In some embodiments, the cap provides a protective cover for a female luer connector when engaged with the connector when threads from the female luer connector engage and form a releasable connection with threads of the cap. Upon mounting the cap 110 onto female luer connectors, the female luer connectors is inserted into the chamber 115 and screwed onto the threads 180 of the cap.

Referring to FIGS. 2 and 4, the absorbent material 130 and the disinfectant or the antimicrobial agent contacts the female luer connector 10 after insertion of the connector 10 through a dilatable opening 162 of the elastic sealing lip 160 to provide passive disinfection via contact with a chemical disinfectant 140 or antimicrobial agent wetted in the absorbent material.

Referring to FIGS. 1-3, the peripheral ledge 116 of the cap 110 includes a recessed cavity 122 in the form of a groove on the interior wall surface 123 of the annular wall 113 configured to house and secure the scrubbing foam 150 and elastic sealing lip 160 to the open end 114 of the cap 110. Referring to FIG. 2, the end face of the cap has an engagement surface 118, where the peelable seal 170 may be secured.

Referring to FIGS. 1-3 and 5, scrubber foam 150 is assembled into the recessed cavity 122 of disinfecting cap 110. Scrubber foam 150 has plurality of bristle-type precut projections 151 for scrubbing the Luer portion of the female needle-free connectors to provide active disinfection via friction as the plurality of bristle-type precut projections 151 scrub the luer portion of the incoming female needle-free connector. Sealing lip 160 is disposed on one of the ends of the scrubber foam 150. Sealing lip 160 presses against the sides of connector 10 and acts as a physical barrier to prevent ingress or entry of debris, contaminants and microbes into the internal chamber 115 of disinfecting cap 110. Scrubbing foam 150 disinfects the outer luer surface of incoming needle-free connector through scrubbing before securement with the internal threads 180 with disinfecting cap 110. The plurality of bristle-type precut projections 151 of scrubbing foam 150 physically removes blood stains, debris, microbes, etc. from the outer luer surface of incoming needle-free connector. The plurality of bristle-type precut projections 151 of scrubbing foam 150 effectively scrub the thread region of female needle-free connectors in order to deeply clean the intricate surfaces in thread region. In one or more embodiments, scrubbing foam 150 is a porous foam which can allow exchange of gases across it thus allowing chemical disinfectant 140 or antimicrobial agent, such as isopropyl alcohol (IPA) to dry slowly and achieve microbial kill due to the drying action.

Retention of chemical disinfectant 140 or antimicrobial agent, such as isopropyl alcohol (IPA) in the plurality of bristle-type precut projections 151 of scrubbing foam 150 occurs due to surface tension which wet the threaded region of the needle-free female luer connector 10 and disinfects it. Clockwise and counter-clockwise rotation of the integral body 111 of the disinfection cap 110 results in a scrubbing action of the plurality of bristle-type precut projections 151 of scrubbing foam 150 on the incoming female connector to actively remove the contaminants by loosening them with mechanical scrubbing action and further disinfect and kill the microbes by chemical disinfection due to disinfectant 140 or antimicrobial agent present in the chamber of the cap and wetted within the pores of the scrubbing foam 150. The plurality of grip members 121 allows the user to better grip the cap 110 to perform the clockwise and counter-clockwise rotation of the integral body 111 of the disinfection cap 110. In one or more specific embodiments, the disinfectant 140 is IPA.

Therefore, the cap of the present disclosure provides both active disinfection of the luer portion of the connector hub via the plurality of bristle-type precut projections 151 of scrubbing foam 150 and passive disinfection of the female connector face via chemical contact with the absorbent material 130 which is wetted with liquid disinfectant or antimicrobial agent 140, such as isopropyl alcohol (IPA).

Sealing lip 160 provides a sealing between internal chamber 115 of disinfecting cap 110 and the external environment to reduce or eliminate microbial and physical debris ingress into the cap 110. Referring to FIG. 2, in one or more embodiments, sealing lip 160 is disposed on one of the ends of the scrubber foam 150 and sealing lip 160 presses against the sides of female connector 10 and acts as a physical barrier to prevent ingress or entry of debris, contaminants and microbes into the internal chamber 115 of disinfecting cap 110. The sealing effect provided by sealing lip 160 which creates a physical barrier to contaminants and microbes across its boundary allows for long term disinfection of the connector by avoiding ingress of physical contaminants and microbes.

Referring to FIG. 2, in one or more embodiments, the elastic sealing lip 160 is in contact with the peripheral ledge 116. Referring to FIGS. 2 and 5, elastic sealing lip 160 comprises a dilatable opening 162 therethrough sized and adapted to receive a female luer connector. The dilatable opening 162 can be sized to frictionally engage a female luer connector. In one or more embodiments, the dilatable opening 162 has a diameter that is dilatable from an initial diameter in a range from about 6-7 mm to a dilated diameter of about 7-8 mm. In one or more embodiments, the female luer connector frictionally engages the scrubber foam upon insertion into the chamber 115 through the dilatable opening 162 of the elastic sealing lip 160. In one or more embodiments, the elastic sealing lip 160 is porous to allow exchange of air across it. In one or more embodiments, the elastic sealing lip 160 is the shape of an O-ring.

Referring to FIG. 5, the elastic sealing lip 160 comprises an elastomeric material. In one or more embodiments, the elastomeric material of the elastic sealing lip 160 comprises a thermoplastic elastomer.

Referring to FIGS. 1-3, the peripheral ledge 116 of the cap 110 includes a recessed cavity 122 in the form of a groove on the interior wall surface 123 of the annular wall 113 configured to house and secure the scrubbing foam 150 and elastic sealing lip 160 to the open end 114 of the cap 110. In one or more embodiments, the opening 120 adjacent the open end 114 of the interior wall surface 123 is sized and adapted to receive an elastic sealing lip 160 in a press-fit connection.

Referring to FIG. 4, in one or more embodiments, the opening 120 adjacent the open end 114 of the interior wall surface 123 of the cap 110 is sized and adapted to receive a female luer connector allowing the female luer connector to enter chamber 115.

In one or more embodiments, the female luer connector frictionally engages the scrubber foam upon insertion into the chamber 115.

Referring to FIG. 1 and FIG. 3, in one or more embodiments, the inner surface of the peripheral ledge includes a cavity 122 in the form of a groove configured to house the elastic sealing ring and scrubbing foam. The groove secures the elastic sealing lip 160 to the open end 114. The cavity 122 prevents the elastic sealing lip and scrubbing foam from moving during insertion of a female luer connector into the dilatable opening 162 of the elastic sealing lip 160.

Subsequent to the initial contact with the scrubber foam after insertion of the connector into the open end 114 of the cap 110, the female luer connector contacts the absorbent material 130 disposed in the chamber 115 which is also wetted with the disinfectant or the antimicrobial agent.

The cap 110 is made from any of a number of types of plastic materials such as polycarbonate, polypropylene, polyethylene, polyethylene terephthalate, polylactide, acrylonitrile butadiene styrene or any other moldable plastic material used in medical devices. In one or more embodiments, the cap 110 comprises a polypropylene or polyethylene material.

Referring to FIG. 2, in one or more embodiments, the absorbent material 130 is under radial compression by the internal threads 180 to retain the absorbent material 130 in the chamber 115. In one or more embodiments, absorbent material 130 is pressed into the disinfecting cap 110, which can retain any disinfectant 140 within it and release when squeezed with incoming needle-free connector. Absorbent material 130 retains disinfectant or antimicrobial agent 140 in its porous structure due to surface tension and releases disinfectant or antimicrobial agent 140 when squeezed or compressed by incoming needle-free female connector. Contact with absorbent material 130 which is wetted with disinfectant 140 keeps the septum and front face of needle free female connector disinfected and provides mechanical barrier to contamination throughout the dwell period of the cap 110 on female connector 10. Absorbent material 130 disinfects the septum of the connector 10 and keeps it disinfected until the cap is removed for vascular line access.

Referring to FIGS. 4 and 6, absorbent material 130 is made of material that does not exert pressure on the septum of connector and hence reduces or avoids ingress of disinfectant or antimicrobial agent 140 into the intravenous (IV) line. In one or more embodiments, the absorbent material 130 is a nonwoven material, foam, or a sponge. In a specific embodiment, the foam is a polyurethane foam. In a specific embodiment the absorbent material 130 is in the form of a foam plug. In a specific embodiment, the absorbent material is a sponge.

The device 100 can achieve disinfection when used on luer connectors by integrating disinfectant or antimicrobial agent 140 in the chamber 115 of the cap 110. The disinfectant or antimicrobial agent can be directly included in the chamber 115 or disinfectant or antimicrobial agent can be absorbed into sponges or foam material that fills the chamber of cap 110. The device is designed to be compatible in interacting with various disinfectants. In one or more embodiments, the disinfectant or antimicrobial agent may include variations of alcohol or chlorhexidine. In one or more embodiments, the disinfectant or antimicrobial agent is selected from the group consisting essentially of isopropyl alcohol, ethanol, 2-propanol, butanol, methylparaben, ethylparaben, propylparaben, propyl gallate, butylated hydroxyanisole (BHA), butylated hydroxytoluene, t-butylhydroquinone, chloroxylenol, chlorhexidine, chlorhexidine diacetate, chlorhexidine gluconate, povidone iodine, alcohol, dichlorobenzyl alcohol, dehydroacetic acid, hexetidine, triclosan, hydrogen peroxide, colloidal silver, benzethonium chloride, benzalkonium chloride, octenidine, antibiotic, and mixtures thereof. In a specific embodiment, the disinfectant or antimicrobial agent comprises at least one of chlorhexidine gluconate and chlorhexidine diacetate. In one or more embodiments, the disinfectant or antimicrobial agent is a fluid or a gel. In one or more specific embodiments, the disinfectant or antimicrobial agent is 70% isopropyl alcohol (IPA).

Referring to FIG. 2 and FIG. 3, in one or more embodiments, the peelable seal 170 is disposed on the engagement surface 118 of the end face of the cap to prevent the disinfectant or the antimicrobial agent from exiting the chamber 115. With the absorbent material 130, sealing lip and scrubbing foam properly inserted into the chamber 115 of the cap 110, the peelable seal 170 may be secured to the end face 117 of the end face of the cap to seal the device 100. The peelable seal 170 minimizes entry of potential particulate hazard and also provides a substantially impermeable enclosure for the device 100, provides a leak prevention and protection enclosure, protects the contents of absorbent material 130 contained within the chamber 115, and/or maintains a sealed, sterilized environment. The peelable seal 170 provides a sufficient seal at a range of temperatures, pressures, and humidity levels.

Referring to FIG. 1, the peelable seal 170 on the end face 117 to prevent the disinfectant or the antimicrobial agent from exiting the chamber 115. In one or embodiments, the peelable seal 170 may be placed on the end face 117 to prevent the disinfectant or the antimicrobial agent from exiting the chamber.

In one or more embodiments, the peelable seal 170 comprises an aluminum or multi-layer polymer film peel back top. In a specific embodiment, the peelable seal 170 is heat-sealed or induction sealed to the end face of the cap to seal the open proximal end. In one or more embodiments, the peelable seal 170 comprises a moisture barrier.

Referring to FIG. 6, compression of the absorbent material 130 toward the closed end 112 of the chamber 115 upon connection to the female luer connector allows the connector to contact the disinfectant or antimicrobial agent to disinfect the female luer connector. Thus, use of the device 100 requires only one single mounting movement by a user. Use of the device 100 does not activate the fluid path of a female luer connector 10 having a septum or a hemodialysis connector having a sheath.

Other aspects of the present disclosure are directed to methods of disinfecting medical connectors and assemblies. As shown in FIG. 6, The disinfection cap of the present disclosure utilizes active disinfection by use of the plurality of bristle-type precut projections 151 of scrubbing foam 150 to disinfect the luer portion of the female connector via friction produced by scrubbing in combination with passive disinfection by use chemical contact of the connector face with the absorbent material wetted with liquid disinfectant, such as IPA.

Referring to FIG. 6, in one or more embodiments, a method of disinfecting a medical connector comprises connecting the device 100 of one or more embodiments to a female medical connector 10, wherein connecting includes frictionally engages the scrubber foam 150 upon insertion into the chamber 115 and the medical connector 10 subsequently contacts the absorbent material 130 and the disinfectant 140 or antimicrobial agent. When the hub of an incoming needle-free female luer connector 10 to be disinfected is inserted into the disinfection device 100, the scrubbing foam 150, which is wetted with disinfectant 140 due to surface tension between the projections, contacts the side threads of the female connector.

The disinfection device 100 herein can achieve disinfection when used on female Luer connectors by active disinfection when the female luer connector is rotated back and forth (clockwise and counterclockwise) in a twisting motion while maintaining contact with the plurality of bristle-type precut projections 151 of scrubbing foam 150 to dislodge the contaminants and debris in combination with passive disinfection of the threads and luer surface when the female luer connector is inserted into cap and makes contact with the liquid disinfectant 140 which is wetted in the absorbent material 130. As shown in FIG. 6, when the female luer medical device is inserted into the chamber 115 of cap 110, disinfectant 140 soaked in the scrubbing foam contacts the distal tip and threads to provide an initial active disinfection. Female luer connector 10 is inserted into cap 110 and the female luer connector 10 is rotated in a repeated clockwise and counterclockwise direction in a twisting motion to disinfect the outer surfaces and threads of the female luer via an active disinfection. The twisting action during attachment of the cap and sponge allows the plurality of bristle-type precut projections 151 of scrubbing foam 150 to contact the internal threads and outer surface to the female luer with a scrubbing action which contributes towards physical removal of microorganisms (i.e., cleaning). Thus the twisting action increases disinfection activity when compared to use of 70% IPA alone. Thus, an advantage of using the cap of the present disclosure is that the cap of the present disclosure allows for disinfection of female luer connectors with both chemical disinfectant (passive disinfection) and scrubbing action (active disinfection). Thus, the combination of passive disinfection with active disinfection results in improved disinfection results. This scrubbing step of the hub can be performed for around 10-15 seconds to achieve a minimum log reduction of microbes (>4 log). At the same time, the septum or front face of connector 10 is also being scrubbed with scrubbing foam 150 and absorbent material 130 thus disinfecting this face as well.

The female connector 10 is further advanced into the cap 110 and screwed onto the cap 110 due to threads 180 present inside the cap 110. This allows the cap 110 to stay connected onto the connector 10 until the connector 10 is accessed again for medication delivery to a patient. The connection of disinfection device 100 can keep the connector 10 disinfected for up to 7 days.

When the connection between the female connector 10 and cap 110 is complete, the sealing lip 160 in the scrubbing foam 150 is pressed against the outer body of connector 10 through interference fit thus creating a seal acting as a mechanical barrier to prevent entry of contaminants and microbes into the inner chamber 115 of cap 110. In one or more embodiments, the cap 110 will remain connected to the vascular access ports until next access.

In one or more embodiments, an assembly comprises the disinfection device 100 of one or more embodiments connected to a medical connector 10. In one or more embodiments, the medical connector 10 is a female luer connector.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has provided a description with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A disinfection device for connection to a female medical connector, the disinfection device comprising:

a cap comprising an integral body, a closed end, open proximal end, an annular wall having an exterior wall surface and an interior wall surface extending from the closed end to the open proximal end and defining a chamber, extending radially outward from the open proximal end defining an end face and an engagement surface, and a peripheral ledge disposed at the open proximal end, the peripheral ledge including a recessed cavity disposed within the interior wall surface near the open proximal end;

a scrubbing foam housed in the recessed cavity of the peripheral ledge near the open proximal end, the scrubbing foam comprising a plurality of bristle-type precut projections;

an elastic sealing lip disposed on the scrubbing foam, the sealing lip having a dilatable opening therethrough sized and adapted to receive a female medical connector, the recessed cavity securing the elastic sealing lip to the open proximal end;

an absorbent material disposed in the chamber, the absorbent material having a lower portion disposed toward the closed end and an upper portion disposed adjacent the recessed cavity, the upper portion of the absorbent material surrounded by the scrubbing foam; and a disinfectant or antimicrobial agent disposed in the chamber.

2. The disinfection device of claim 1, wherein the female medical connector is selected from a group consisting essentially of needle-free connectors, catheters, luer connectors, stopcocks, and hemodialysis connectors.

3. The disinfection device of claim 1, wherein the dilatable opening sized to frictionally engage a female luer connector.

4. The disinfection device of claim 1, wherein the elastic sealing lip is in contact with the peripheral ledge.

5. The disinfection device of claim 1, wherein the dilatable opening has a diameter that is dilatable from an initial diameter in a range from about 6-7 mm to a dilated diameter of about 7-8 mm.

6. The disinfection device of claim 1, further comprising internal threads adjacent the closed end that partially extend along a length of the interior wall surface of the annular wall.

7. The disinfection device of claim 1, wherein the elastic sealing lip comprises an elastomeric material.

8. The device of claim 1, wherein the exterior wall surface includes a plurality of grip members.

9. The disinfection device of claim 1, wherein the absorbent material is a foam.

10. The disinfection device of claim 9, wherein the foam is a polyurethane foam.

11. The disinfection device of claim 1, wherein the absorbent material is a sponge.

12. The disinfection device of claim 1, wherein a compression of the absorbent material toward the closed end of the chamber occurs upon connection to the female luer connector.

13. The disinfection device of claim 12, wherein compression of the absorbent material disinfects a face and threads of the female medical connector.

14. The disinfection device of claim 13, wherein the absorbent material is under radial compression by the internal threads to retain the absorbent material in the chamber.

15. The disinfection device of claim 1, wherein the disinfectant or antimicrobial agent is selected from a group consisting essentially of isopropyl alcohol, ethanol, 2-propanol, butanol, methylparaben, ethylparaben, propylparaben, propyl gallate, butylated hydroxyanisole (BHA), butylated hydroxytoluene, t-butyl-hydroquinone, chloroxylenol, chlorhexidine, chlorhexidine diacetate, chlorhexidine gluconate, povidone iodine, alcohol, dichlorobenzyl alcohol, dehydroacetic acid, hexetidine, triclosan, hydrogen peroxide, colloidal silver, benzethonium chloride, benzalkonium chloride, octenidine, antibiotic, and mixtures thereof.

16. The disinfection device of claim 15, wherein the disinfectant or antimicrobial agent comprises at least one of chlorhexidine gluconate and chlorhexidine diacetate.

17. The disinfection device of claim 16, wherein the disinfectant or antimicrobial agent is a fluid or a gel.

18. The disinfection device of claim 1, further comprising a peelable seal on the end face of the open proximal end to prevent the disinfectant or the antimicrobial agent from exiting the chamber.

19. The disinfection device of claim 18, wherein the peelable seal comprises an aluminum or multi-layer polymer film peel back top.

20. The disinfection device of claim 18, wherein the peelable seal is heat-sealed or induction sealed to the engagement surface.

21. A method of disinfecting a medical connector, the method comprising: connecting the disinfection device of claim 1 to a medical connector, wherein connecting includes engaging the interior wall surface upon insertion into the chamber such that the medical connector contacts the scrubbing foam, absorbent material and the disinfectant or antimicrobial agent;

performing clockwise and counter-clockwise rotation of the bristle-type precut projections on the incoming female connector to actively remove the contaminants by loosening them with mechanical scrubbing action and further disinfect and kill the microbes by chemical disinfection due to disinfectant.

22. The disinfection device of claim 1, wherein the plurality of bristle-type precut projections extend radially inward from the interior wall surface toward the upper portion of the absorbent material.

23. The disinfection device of claim 1, wherein the scrubbing foam is ring shaped and encircles the upper portion of the absorbent material.

* * * * *